United States Patent
Falkenberg

(10) Patent No.: US 6,982,947 B1
(45) Date of Patent: Jan. 3, 2006

(54) METHOD AND DEVICE FOR DECODING A CODE MULTIPLEX SIGNAL

(75) Inventor: Andreas Falkenberg, San Diego, CA (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/959,258

(22) PCT Filed: Apr. 13, 2000

(86) PCT No.: PCT/DE00/01164

§ 371 (c)(1),
(2), (4) Date: Oct. 22, 2001

(87) PCT Pub. No.: WO00/65737

PCT Pub. Date: Nov. 2, 2000

(30) Foreign Application Priority Data

Apr. 22, 1999 (DE) ................................. 199 18 386

(51) Int. Cl.
*H04J 11/00* (2006.01)
(52) U.S. Cl. ...................... 370/208; 370/335; 370/342; 375/136

(58) Field of Classification Search ........ 370/203–208, 370/312, 335, 342, 441; 375/130–143, 147–152
See application file for complete search history.

(56) References Cited

U.S. PATENT DOCUMENTS

| 4,638,494 | A | | 1/1987 | Kartchner et al. |
| 5,237,586 | A | * | 8/1993 | Bottomley ................. 370/206 |
| 5,537,396 | A | | 7/1996 | Kanda et al. |
| 5,793,794 | A | * | 8/1998 | Kato et al. .................. 375/149 |
| 6,272,168 | B1 | * | 8/2001 | Lomp et al. ................ 375/222 |
| 6,501,788 | B1 | * | 12/2002 | Wang et al. ................ 375/148 |
| 6,519,237 | B1 | * | 2/2003 | McDonough et al. ....... 370/335 |
| 6,539,009 | B1 | * | 3/2003 | Zhou et al. ................. 370/342 |
| 2004/0258027 | A1 | * | 12/2004 | Tsybakov et al. ........... 370/335 |

* cited by examiner

*Primary Examiner*—John Pezzlo
*Assistant Examiner*—Dmitry Levitan
(74) *Attorney, Agent, or Firm*—Staas & Halsey LLP

(57) ABSTRACT

In order to select from a plurality of codes the correct code for decoding a code division multiplex signal, in each case individual codes are combined to form combination codes which are compared with the received code division multiplex signal. Then, the individual codes of that combination code which has the greatest similarity with the code division multiplex signal are compared individually with the received code division multiplex signal, and the code most similar to the code division multiplex signal is selected for decoding.

12 Claims, 1 Drawing Sheet

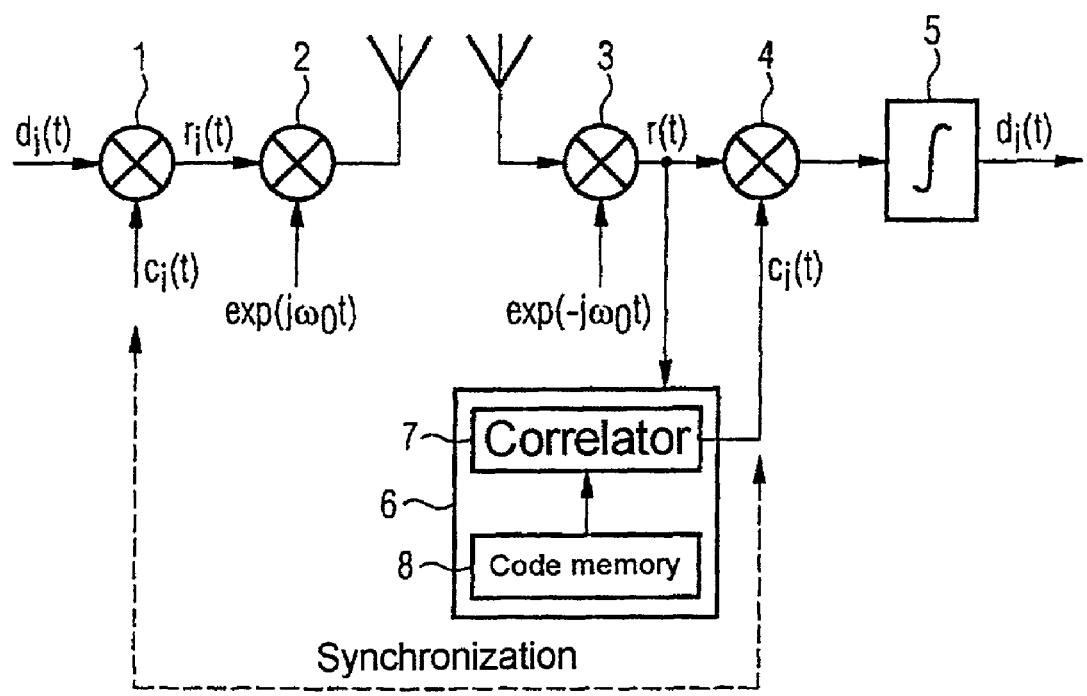

METHOD AND DEVICE FOR DECODING A CODE MULTIPLEX SIGNAL

CROSS REFERENCE TO RELATED APPLICATIONS

This application is based on and hereby claims priority to PCT Application No. PCT/DE00/01164 filed on Apr. 13, 2000 and German Patent Application No. 199 18 386.4, filed Apr. 22, 1999, the contents of which are hereby incorporated by reference.

BACKGROUND OF THE INVENTION

1. Field of the Invention

The present invention relates to a method for decoding a code division multiplex signal using a code selected from various codes available for decoding, based on comparison with the code division multiplex signal.

2. Description of the Related Art

The code division multiplex access (CDMA) technique is a multiple access method in which all subscribers of the appropriate mobile radio system are permitted to make simultaneous use of the entire available system bandwidth. To be able to avoid collisions between the individual subscribers, the individual subscriber signals are provided with different code sequences which thereby permits a unique assignment of the received signals. Spreading of the individual signals occurs during this process, as a result of which the bandwidth is multiplied, for which reason this technique is also denoted as a spread spectrum technique. The receiver receives this signal, demodulates it and carries out despreading, use being made of a spread signal which is synchronous with the transmitter. The transmitter admittedly receives not only the desired signal of the transmitter, but also additional signals from other transmitters, which transmit in the same frequency band. However, the despreading operation ensures that it is only the signal which uses the same and synchronous spreading code as the receiver which is despread and at its bandwidth reduced.

It is therefore important to carry out synchronization between the transmitter and the receiver in CDMA systems. As a rule, this is performed in several steps using control information transmitted specifically for this purpose, frequent synchronization initially being carried out, followed by temporal synchronization. This requires carrying out in the receiver code synchronization or code identification in order to determine that spreading and scrambling code with the aid of which the transmitter signal has been encoded. Only then is it possible to despread or decode the received signal.

In order to find the correct code for the decoding operation, all available codes must be correlated at the receiver end with the received signal, the code to be used then being selected as that one whose code sequence has the greatest correspondence or similarity with the received signal. That is to say, the following sum is formed for each possible code sequence $c_i$ with reference to the received signal sequence $r(t)$:

$$\sum_{t=0}^{T} r(t) \cdot c_i(t)$$

Here, T denotes the correlation time interval over which the multiplication results between the individual values of the received signal sequence $r(t)$ and the code sequence $c_i(t)$ are summed or integrated.

As an example, 16 possible codes are provided, that is to say i=0 . . . 15, for the UMTS (Universal Mobil Telecommunication System) mobile radio standard. The results calculated in accordance with the above formula for the individual code sequences $c_i(t)$ are compared, and that code sequence $c_x(t)$ with the maximum energy value, that is to say with the greatest correspondence or similarity with the received sequence $r(t)$, is determined. It can then be assumed that the transmitted signal has been encoded with the aid of this code so that subsequently decoding is carried out with the aid of this code.

It may be seen with the aid of the above formula that for n different codes it is necessary in general to carry out n correlations with a corresponding number of multiplications. This can be very complicated, and requires a correspondingly high outlay on hardware for adders and multipliers in the receiver.

SUMMARY OF THE INVENTION

It is therefore the object of the present invention to provide an improved method and a corresponding device for decoding a code division multiplex signal, it being possible, in particular, to determine the code used for encoding in a simpler and quicker way and to decode the code division multiplex signal reliably in a corresponding way.

According to the invention, in each case a plurality of available codes are combined to form combination codes which are compared, that is to say correlated, subsequently in each case with the received signal in order to determine that combination code which has the greatest similarity with the code division multiplex signal. Subsequently, it is further necessary to correlate individually with the code division multiplex signal only the individual codes which have been combined to form this combination code, in order subsequently to be able to determine the code used for encoding the division multiplex signal, and for the purpose of decoding.

If, for example, there are n different codes, and if in each case m of these codes are combined to form a combination code, only n/m+m correlations are required in accordance with the initially presented formula in order to determine the code used for decoding.

It is particularly advantageous to add two individual codes to form a combination code in each case.

Particularly in the case of orthogonal codes, it can be assumed that during correlation of the generated combination codes with the aid of the initially described formula a maximum value is calculated whenever the corresponding combination code includes the code used for encoding by the transmitter such that reliable preselection can be made with the aid of the combination codes. However, there is the precondition in this case that each individual code has been used only for one of the combination codes.

If, for example, a total of 16 different codes are available, if two of these codes are added in each case to form a combination code, a number of possible codes can initially be reduced to two with the aid of only eight correlations, and the code actually used can subsequently be determined from these two codes with the aid of two further correlation calculations such that a total of only ten correlations are required.

The present invention can be used, in particular, in UMTS mobile radio receivers and offers particular advantages when the number n of possible codes is relatively large, for example also larger than 16.

BRIEF DESCRIPTION OF THE DRAWINGS

These and other objects and advantages of the present invention will become more apparent and more readily appreciated from the following description of the preferred embodiments, taken in conjunction with the accompanying drawings of which:

Here, the sole FIG. 1 shows a simplified illustration explaining the principle of signal transmission between a CDMA transmitter and a CDMA receiver in accordance with the present invention.

DETAILED DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

As has already been explained, during application of the CDMA technique the data $d_i(t)$ of a transmission channel or subscriber i that are to be transmitted are firstly provided in the transmitter with a subscriber-specific code sequence $c_i(t)$ which ensures that a unique assignment of the received signals is possible at the receiving end. Spreading of the individual signals occurs during this process, as a result of which the bandwidth is multiplied, for which reason this technique is also denoted as a spread spectrum technique. In accordance with FIG. 1, the data $d_i(t)$ of the subscriber i that are to be transmitted are therefore firstly fed to a multiplier 1 and multiplied or spread by the subscriber-specific code sequence $c_i(t)$, which is independent of the data to be transmitted. The signal $r_i(t)$ thus obtained is subsequently modulated with the aid of a further multiplier 2 onto a radio-frequency carrier $\exp(\omega_0 t)$ and transmitted via an antenna to a receiver via a bandpass filter (transmit filter) (not shown in FIG. 1) and a power amplifier (likewise not illustrated in FIG. 1), which ensures the transmit power required.

The receiver receives this signal from its antenna and demodulates it with the aid of a multiplier (3). A bandpass filter (not shown) for selection and noise reduction can be provided between the antenna and the multiplier or demodulator 3 of the receiver. Despreading of the demodulated signal r(t) is carried out with the aid of a further multiplier 4, use being made of a spread signal $c_i(t)$ synchronous with the transmitter. The receiver admittedly receives not only the desired signal of the transmitter, but also additional signals from other transmitters which transmits in the same frequency band. However, the described despreading operation ensures that it is only the signal which uses the same and synchronous spreading code $c_i(t)$ as the receiver that is despread and has its bandwidth reduced, so that after the despreading the desired signal $d_i(t)$ can be filtered out of the added signal in a simple way. For this purpose, an integrator 5 is provided in FIG. 1 which acts in the spectral band like a lowpass filter.

The spreading/despreading or encoding/decoding is therefore performed by multiplication by a broadband noise signal $c_i(t)$. It would be ideal if it were possible to use as noise signal $c_i(t)$ a reproducible noise sequence without statistical connection or correlation between the individual elements of the sequence. Such ideal noise sequences cannot, however, be reproduced technically in the form required for the spread spectrum technique, and so use is made, as code sequences $c_i(t)$, of noise-like sequences, what are termed Pseudo Noise (PN-) sequences.

It becomes clear from the above description that reliable decoding of a code division multiplex signal presupposes selecting the subscriber-specific code sequence $c_i(t)$ used by the transmitter from a plurality of available codes at the receiver end, and feeding them to the decoder or multiplier 4.

For this reason, provision is made in accordance with FIG. 1 of a code selection device 6 which is fed the demodulated received signal r(t). By correlation calculations, the code selection device 6 can determine that code which has been used by the transmitter to encode the code division multiplex signal r(t).

According to the invention, for this purpose, the code selection device 6 comprises a code memory 8 in which all available code sequences $c_i(t)$ are stored. A correlation or comparison device 7 accesses the code memory 8 and combines the individual code sequences $c_i(t)$ stored in the code memory 8 in accordance with a prescribed scheme to form combination codes which are then used to make a preselection by comparison with the received signal sequence r(t).

The correlation device 7 can be configured, in particular, in such a way that in each case it adds two different code sequences and the addition or combination code sequences thereby obtained to the received signal sequence in accordance with the following formula:

$$\sum_{t=0}^{T} r(t) \cdot (c_{2i}(t) + c_{2i+1}(t))$$

The code sequences $c_0(t)$ and $c_1(t)$, $c_2(t)$ and $c_3(t)$, $c_4(t)$ and $c_5(t)$ etc. are therefore added in the case of the present exemplary embodiment, and the addition results obtained therefrom are multiplied in each case by the received signal sequence r(t). The code pairs can, however, be selected arbitrarily in general. Moreover, it is conceivable in principle also to combine with one another more than two codes in each case, or to select a type of combination other than an addition.

The correlation results, calculated with the aid of the above formula, of the individual addition code sequences are compared with one another. It may be assumed in the case of orthogonal codes, in particular, that a maximum correlation value is calculated for that addition code sequence which also has the code sequence used by the transmitter. The correlation device 7 can thereby make a preselection, and given the presence of, for example, n=16 possible code sequences, it can reduce the number of possible code sequences to two with the aid of only eight correlation calculations.

After the correlation device has determined the addition code sequence with the maximum correlation value, it must now carry out a correlation of the individual code sequences, contained in the corresponding addition code sequence, with the received signal r(t), in order to be able to determine the code used by the transmitter by the comparison of these correlation results, and to be able to feed it to the multiplier 4 for the purpose of decoding the received signal.

Since the method previously presented has a somewhat lower accuracy than the conventional method described at the beginning, in the case of which each individual code is correlated with the received signal, it constitutes a possibility for quick code identification with a low outlay, particularly in the case of signals of good reception quality.

The present invention can be used, in particular, in UMTS mobile radio receivers. Sixteen possible codes are provided in accordance with the UMTS mobile radio standard. The advantages of the invention become ever more interesting, however, with an increasing number of possible codes.

The invention has been described in detail with particular reference to preferred embodiments thereof and examples, but it will be understood that variations and modifications can be effected within the spirit and scope of the invention.

What is claimed is:

1. A method for decoding a code division multiplex signal using one of a plurality of individual codes available for decoding, comprising:
    combining at least some of the individual codes to generate combination codes;
    comparing each of the combination codes with the received code division multiplex signal;
    determining a most similar combination code to the code division multiplex signal, from among the combination codes;
    determining a most similar individual code to the code division multiplex signal, from among the individual codes forming the most similar combination code; and
    decoding the received code division multiplex signal using the most similar individual code.

2. The method as claimed in claim 1, wherein said combining in each case combines two of the individual codes to form one of the combination codes.

3. The method as claimed in claim 1, wherein each combination code is generated by adding corresponding individual codes.

4. The method as claimed in claim 1,
    wherein said comparing comprises:
        multiplying individual signal values of the received code division multiplex signal by values of the combination and individual codes to produce multiplication results, and
        respectively adding the multiplication results, and
    wherein said determining identifies as the most similar combination and individual codes, one of the combination codes and one of the individual codes respectively having a largest sum of the multiplication results.

5. The method as claimed in claim 1, wherein the individual codes available for decoding the code division multiplex signal are orthogonal codes.

6. A device for decoding a code division multiplex signal, comprising:
    storage means for storing individual codes available for decoding;
    comparison means for respectively combining a plurality of the individual codes stored in said storage means to form combination codes, for comparing the code division multiplex signal with each of the combination codes to determine a most similar combination code to the code division multiplex signal and for comparing the code division multiplex signal with each of the individual codes forming the most similar combination code to determine a most similar individual code to the code division multiplex signal; and
    decoding means for decoding the code division multiplex signal using the most similar individual code.

7. The device as claimed in claim 6, wherein said comparison means respectively combines two of the individual codes to form one of the combination codes.

8. The device as claimed in claim 6, wherein said comparison means generates each combination code by adding corresponding individual codes.

9. The device as claimed in claim 6, wherein said comparison means compares the received code division multiplex signal with the combination codes and the individual codes by respectively multiplying individual signal values of the code division multiplex signal by values of the combination codes and the individual codes, adding multiplication results, and selecting as the most similar combination and individual codes, one of the combination codes and one of the individual codes respectively having a largest sum of the multiplication results.

10. The device as claimed in claim 6, wherein the individual codes stored in the storage means are orthogonal codes.

11. A mobile radio receiver receiving a code division multiplex signal modulated onto a carrier signal, comprising:
    a demodulator to demodulate the code division multiplex signal,
    a storage unit to store individual codes available for decoding;
    a comparison unit, coupled to said demodulator and said storage unit, respectively combining a plurality of the individual codes stored in said storage unit to form combination codes, comparing the code division multiplex signal with each of the combination codes to determine a most similar combination code to the code division multiplex signal and comparing the code division multiplex signal with each of the individual codes forming the most similar combination code to determine a most similar individual code to the code division multiplex signal; and
    a decoder, coupled to said comparison unit, to decode the code division multiplex signal using the most similar individual code.

12. The mobile radio receiver as claimed in claim 11, wherein the mobile radio receiver is a UMTS mobile radio receiver.

* * * * *